Figure 1:
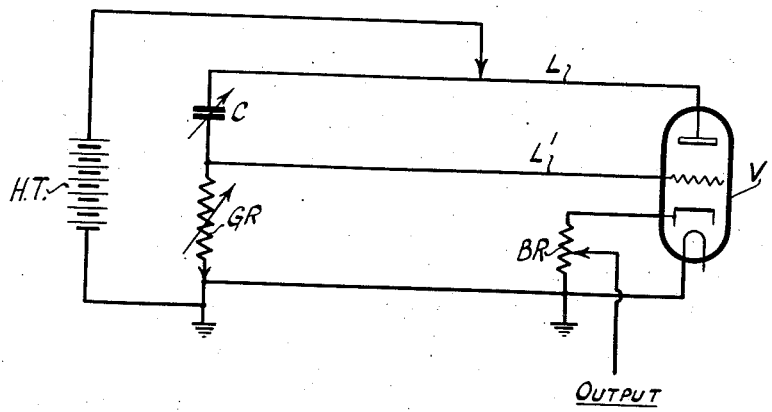

July 11, 1944.                T. D. PARKIN                 2,353,493
                QUENCHED ELECTRIC OSCILLATION GENERATOR
                         Filed Oct. 28, 1942

INVENTOR.
THOMAS DIXON PARKIN
BY
    H.S.Grover
       ATTORNEY.

Patented July 11, 1944

2,353,493

UNITED STATES PATENT OFFICE 2,353,493

QUENCHED ELECTRIC OSCILLATION GENERATOR

Thomas Dixon Parkin, Broomfield, near Chelmsford, England, assignor to Radio Corporation of America, a corporation of Delaware Application October 28, 1942, Serial No. 463,596
In Great Britain June 13, 1941

6 Claims. (Cl. 250—36)

The present invention relates to quenched electric oscillation generators.

According to the present invention a quenched oscillation generator comprises an electronic valve having a cathode, an anode, and at least one intermediate electrode, such as a grid, serving as a control electrode; a condenser connected across the intermediate electrode anode space of the valve by means of a parallel line circuit; a grid resistor connected across the intermediate electrode-cathode space of the valve by means including one conductor or a part of one conductor of the parallel line circuit; and a source of current connected across the (series-connected) condenser and grid resistor; and wherein the capacity of the condenser, resistance of the resistors, and voltage of the source of current, and, it may be, the position at which the grid resistor is connected to the said one conductor, and the position on the anode conductor of the parallel line circuit at which potential from the source of current is applied are so chosen that, in addition to generating high-frequency or ultra-high-frequency oscillations, the generator generates and applies to the control electrode a lower frequency pulse which serves to quench the device as an oscillation generator.

If necessary, the generator may include a bias-resistor or a bias-conductor in the cathode leg.

The parallel line may be a lecher wire circuit as shown in the drawing, or a coaxial line whose outer conductor of the line is connected to the anode of the valve, and whose inner conductor is connected to the intermediate electrode, or vice versa.

Figure 2:
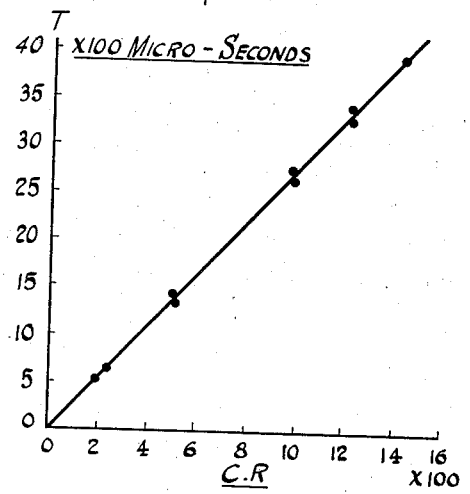

The invention is illustrated in or discussed in connection with the accompanying drawing of which Figure 1 illustrates a circuit arrangement according to the invention and Figure 2 is a curve connecting the product CR of the values of the capacity of the condenser and of the resistance of the grid resistor with the repetition period to all intents and purposes.

In Figure 1, a valve V is shown as having its anode and grid connected, respectively, to the conductors L, L' of a parallel line circuit, the remote end of which is bridged by the variable condenser C. Connected between the cathode and earth is a bias resistor BR and connected from the remote end of the lower (grid) conductor L' of the parallel line to earth is a grid resistor GR. Connected across the series-connected condenser C and grid resistor GR is a source of high tension current HT. As shown, the positive terminal of HT is connected to an intermediate point in the upper (anode) conductor L of the parallel line.

In a circuit set up as above described, and having appropriate values and adjustments, a cycle of operations involves two main periods of time, namely:

1. That period of time during which the condenser is charging through the grid resistance; and
2. That period of time during which the circuit is operating as a high frequency or ultra high frequency oscillation generator.

The sum of periods 1 and 2 may be referred to as the repetition period RP, and period 2 may be referred to as the pulse period.

Within the period 2 interest is centered in the periodic time of the oscillations generated.

The frequency of the oscillation may be made very high and, in experiments which have been made, frequencies of the order of 300 mc./s. have been obtained.

The time 1 occupied in charging the condenser is mainly a function of the product of the values of the capacity of the condenser and of the resistance of the grid resistor, and in a lesser degree of the value of the resistance of the bias resistor or bias inductor, of the position relatively to the valve, condenser, and parallel line of the grid resistor, and of the voltage applied to the system.

The pulse period 2 is best regarded as a fraction of the total repetition period (sum of 1 and 2) and measurements indicate that this fraction is inversely proportional to the value of the grid resistor when this resistor is the only variable of the circuit.

In most of the measurements which have been made the high tension has been applied directly at the upper terminal of the condenser, and an oscillograph has been connected across the bias resistor for the purpose of measurement, but at the shortest repetition periods it has been found advisable to apply the H. T. at a point along the line nearer to the anode of the valve and to reduce the bias resistor to a lower value than that used at the longer periods and also to apply the measuring oscillograph at an intermediate point on the grid line.

The operation of the circuit appears to take place in the following manner:

After the initial disturbance due to the switching on of the H. T. supply has subsided, and the first period of high frequency oscillation has ended, the potential of the grid of the valve relatively to that of the cathode will have become sufficiently negative to prevent further oscillation and the generation of oscillations will stop. Generation cannot re-start until the potential of the grid relatively to that of the cathode shall have been restored to its normal static value. The rate of restoration is governed mainly by the product CR of the capacity of the condenser and the resistance of the grid resistor and the voltage applied thereto. In due time the restoration is sufficient to allow oscillations, which are of a frequency determined by the constants of the line, again to be generated. The cyclic process is then repeated.

The total repetition period of charging and discharging the condenser can be regulated to occupy many seconds, or minute fractions of a second. This variation in length of time can be brought about, to all intents and purposes, by the use of the correct combination of values of capacity and resistance, and it has been found that over a wide range of time-constants the equation $$K_1(CR) = T$$

where C is the capacity of the condenser in microfarads, R is the resistance of the grid resistor in ohms, T is the time of repetition in microseconds, and $K_1$ is a constant depending upon the arrangement of the circuit used. This equation holds good for repetition periods over a wide range whatever the values of capacity and resistance used, provided that the resistance is not of such a low value as to permit of a destructive anode current flowing, and that the condenser has a sufficiently large capacity to receive the requisite charge. This relationship is shown in Figure 2. It would appear that if the repetition period becomes very long, there is some departure from the equation given, and in one case in which the calculated repetition period should have been of approximately 530,000 microseconds, by measurement, it was 465,000 microseconds. This may be due to a number of causes, one being the quality of the condenser used, i. e., freedom from self-inductance and shunt resistance. If the repetition period becomes very short then the measured values of the capacity and resistance cannot be accepted as the total value in either case, for in the case of the capacity, that of the line and valve must be considered, and the resistance of the bias-resistor has an influence upon the final result. In the case of highest repetition frequency obtained, the time of repetition should according to the formula have been of much shorter duration than the duration actually measured.

At the larger repetition periods the position of the grid leak resistor is of no great importance since the circuit will function with this resistor connected to the remote end of the parallel line (directly to the condenser) or placed close up against the valve. The position of this resistance, however, at the shorter repetition periods, has a marked effect upon the time of repetition. As a typical case, one arrangement of condenser-resistance gave a repetition time of 126.7 microseconds, when the resistance was placed at the extremity of the line and immediately connected to the condenser, and 119.2 microseconds when connected as close to the valve as was possible.

The value of the bias resistor has also a considerable influence upon the repetition time. Measurements show that with a certain arrangement of capacity and resistance and with a bias-resistor of 1,000 ohms the time was 126.7 microseconds, with 100 ohms it was 143 microseconds, and with zero resistance it was 153.5 microseconds.

Change of anode voltage also influences the periodic time. For example, with an applied voltage of 520 volts, the time in one case was 126.7 microseconds, and a reduction to 300 volts increased the time to 130.8 microseconds.

The ability to change the repetition period by the alteration of the position of the resistance is of use.

It has been found by measurement, that the amplitude of the voltage pulse is greater at the lower repetition periods than at the higher. Also as the period gets shorter the form of the pulse tends to lose its sharpness and becomes more curved at the initial portion.

Further, if the bias resistor is replaced by a suitable inductance, then the amplitude of the voltage pulse across it may greatly increase, but it is no longer a positive impulse, but one of alternating form having a negative value as well as the positive one.

The ratio of the pulse period to the total repetition period is inversely proportional to the reciprocal of the value of the grid resistor in ohms, all other details of the circuit remaining unaltered. From this one obtains the expression $$K_2\left(\frac{1}{R}\right) = \frac{P}{T}$$

wherein R is the value of the grid resistor in ohms and $K_2$ is a constant depending upon the circuit used.

If

P is duration of the pulse period in microseconds
M is duration of the inactive period in microseconds
T is total time of repetition in microseconds
C is the capacity of the condenser in microfarads
R is the resistance of the grid resistor in ohms $$T = P + M = K_1(CR)$$

$$K_2 \frac{1}{R} = \frac{P}{T} = \frac{P}{K_1(CR)}$$

$$K_1 K_2 C = P$$

Pulse time P is a constant for a change of resistance with a fixed condenser, the other portions of the circuit remaining untouched.

In the foregoing statements, which apply specifically to a parallel line system, it is assumed that the only load applied to the system is that of the oscillograph by which means the observations were made, and that this load is substantially constant.

The bias resistor BR is not absolutely essential for the operation of the system, though it does provide a very convenient point from which the pulse oscillations can be taken from the system.

As a controller of a self-oscillator a connection may be taken from the junction of the condenser and resistance.

The oscillograph has shown that at the longer repetition period the shape of the pulse is substantially positively rectangular in form if the grid bias element is a resistor. If this resistor is replaced by an inductance, the amplitude of the voltage-pulse may increase, but the pulse loses its sharp form, and becomes alternating in character, having a negative value as well as a positive one. Also as the repetition period becomes of shorter duration the shape of the pulse becomes more curved in character.

In practice it has been found that the value of the grid resistor should not be too low as otherwise excessive current is fed to the valve. This is because the grid will not become sufficiently negative to cut off the valve, and the circuit will not function. A resistance of 20,000 ohms can be regarded as a useful lower limit in most cases.

Whilst a parallel line system is convenient, a system using a coaxial line may be used, the outer conductor being connected to the anode of the valve and the inner to the control grid, or vice versa. Such an arrangement operates satisfactorily although the values of the components, for given results, differ from those of the unshielded parallel line system.

In a modification, the whole system including valve, parallel or coaxial lines, condensers, and resistances, was enclosed in a closed metal cylinder, preferably a copper cylinder. This produced results of the same order as those described already. Such an arrangement has the advantage that it is less liable to external interference, and the repetition period is longer for the same combination or capacity and resistance, or stated differently, the values of the components, for given results, differ from those of the unshielded parallel line system.

The circuit can be used as a controller for a self-oscillator, as it will "lock" and hold such an oscillator to the repetition frequency over a change of circuit values of the self-oscillator.

The invention is susceptible of further modifications. Thus if high-frequency oscillations are required whose frequency is lower than those usually obtained by the use of a parallel line or coaxiel line system, they can be obtained by the use of a system in which parallel lines are replaced by inductances of sufficient value to produce the desired result.

In the diagram the high-tension is shown as being applied directly to some point on the conductor connected to the anode. This is for simplicity, but it does not preclude the use of a choke in the high-tension line.

What is claimed is:

1. A generator of quenched oscillation comprising an electronic valve having a cathode, an anode, and at least one intermediate electrode; a condenser connected across the intermediate electrode-anode space by means of a parallel line circuit, a grid resistor connected across the intermediate electrode-cathode space by means including at least a portion of one conductor of the parallel line circuit; and a source of current directly connected across the series condenser and grid resistor by means of a pair of leads, one of said leads being connected to the anode conductor of said parallel line circuit at a point which is substantially midway between the anode and said condenser, the whole circuit arrangement and the circuit parameters having such adjustments and values that the circuit generates ultra high and frequency oscillations and also generates and applies to the intermediate electrode a voltage pulse at a frequency lower than the frequency of said oscillations, said voltage serving periodically to quench the device as an oscillation generator.

2. A generator of quenched oscillations comprising an electronic device having an indirectly heated cathode, a filament, an anode and a grid, a parallel conductor line connected to said anode and grid, a condenser connected across the conductors of said line at points removed from said anode and grid, a grid resistor connected at one one to one of the conductors of said line and at its other end to a lead extending to the filament of said device, a source of direct current having a negative terminal connected to said filament and a positive terminal connected to that conductor of said line in circuit with the anode, an unbypassed bias resistor connected across the cathode and filament, the whole circuit arrangement and the circuit parameters being such that the circuit generates ultra-high-frequency oscillations and also generates and applies to the grid a voltage pulse at a frequency lower than the frequency of said oscillations, said voltage serving periodically to quench the device as an oscillation generator, and an output circuit coupled to a point on said unbypassed resistor.

3. A generator of quenched oscillations comprising an electronic device having an indirectly heated cathode, a filament, an anode and a grid, a parallel conductor line connected to said anode and grid, a condenser connected across the conductors of said line at points removed from said anode and grid, a grid resistor connected at one terminal to the grid conductor of said line at the end thereof removed from said grid, and connected at its other terminal to a lead extending to the filament of said device, a source of unidirectional current having a negative terminal connected to said filament and a positive terminal connected by an adjustable tap to that conductor of said line in circuit with the anode, an unbypassed bias resistor connected across the cathode and filament, the whole circuit arrangement and the circuit parameters being such that the circuit generates ultra high frequency oscillations and also generates and applies to the grid a voltage pulse at a frequency lower than the frequency of said oscillations, said voltage serving periodically to quench the device as an oscillation generator, and an output circuit coupled to a point on said unbypassed resistor.

4. A generator as defined in claim 1, wherein the grid resistor is variable.

5. A generator as defined in claim 1, wherein the condenser is variable.

6. A generator of quenched oscillations comprising an electronic valve having a cathode, an anode, and at least one intermediate electrode; a variable condenser connected across the intermediate electrode-anode space by means of a parallel line circuit, a variable grid resistor connected across the intermediate electrode-cathode space by means including at least a portion of one conductor of the parallel line circuit; and a source of unidirectional current directly connected across the series condenser and grid resistor by means of a pair of leads, one of said leads being connected to the anode conductor of said parallel line circuit at a point which is substantially midway between the anode and said condenser, the whole circuit arrangement and the circuit parameters having such adjustments and values that the circuit generates ultra high frequency oscillations and also generates and applies to the intermediate electrode a voltage pulse at a frequency lower than the frequency of said oscillations, said voltage serving periodically to quench the device as an oscillation generator.

THOMAS DIXON PARKIN.